Aug. 7, 1934.　　　　M. MUELLER　　　　1,969,028
MACHINE FOR FORMING CLAY PRODUCTS
Filed Jan. 28, 1933　　　3 Sheets-Sheet 1

Inventor.
Max Mueller.

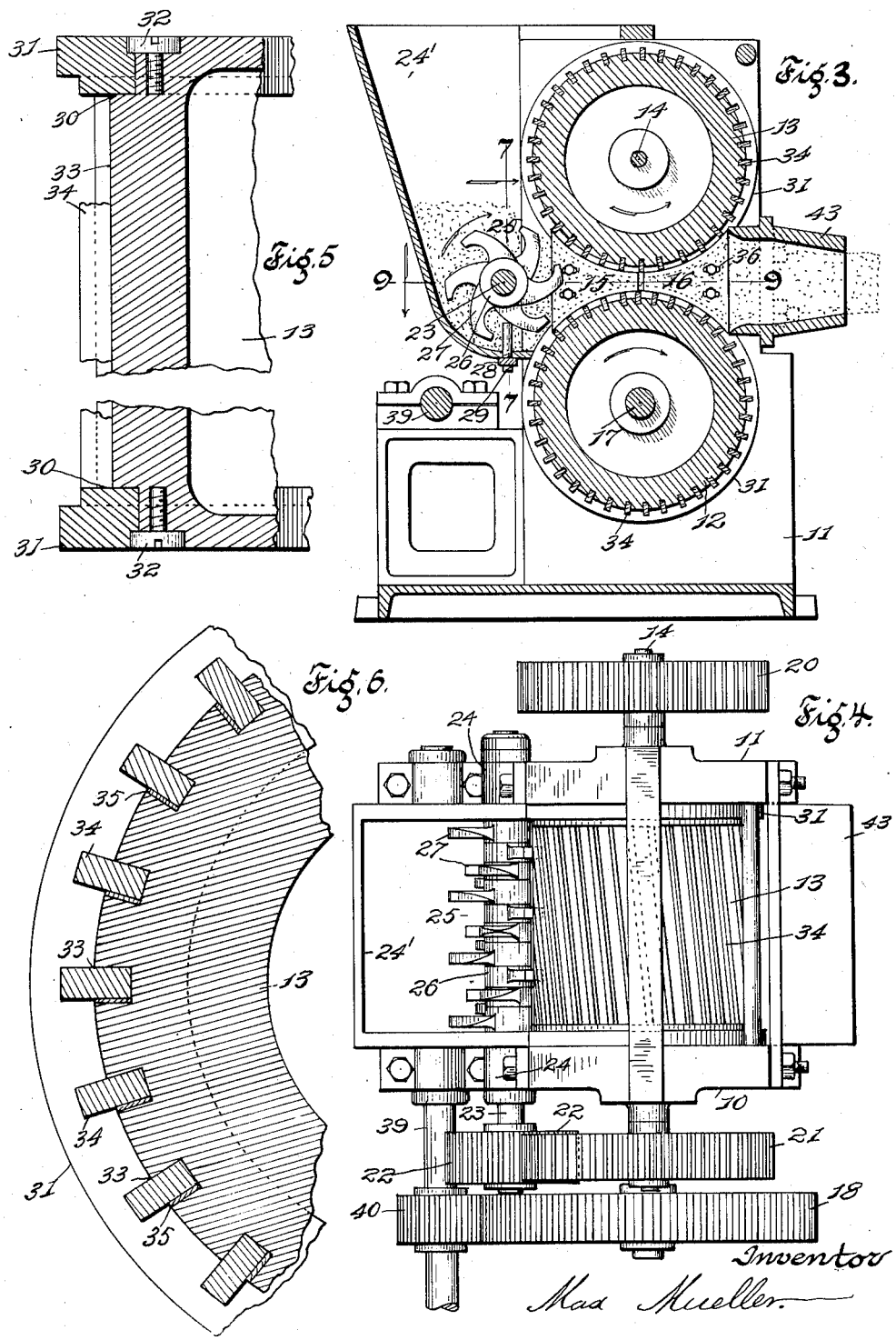

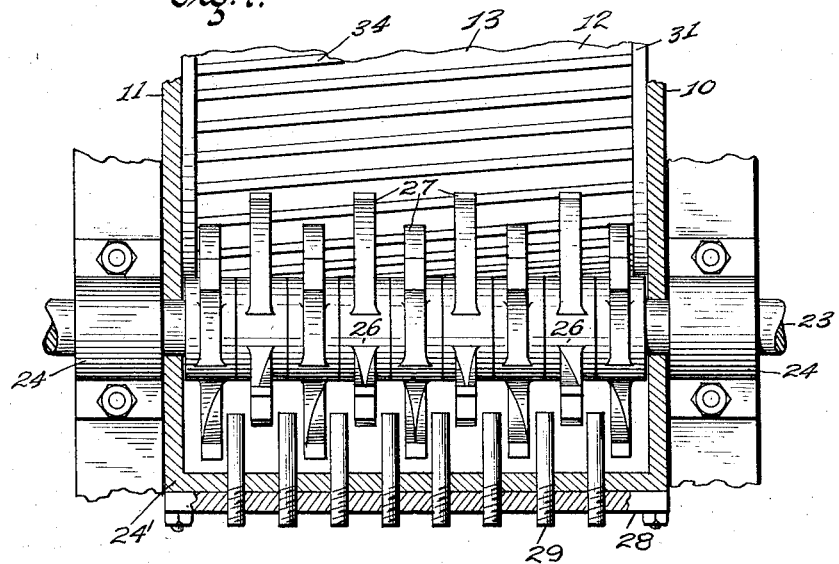
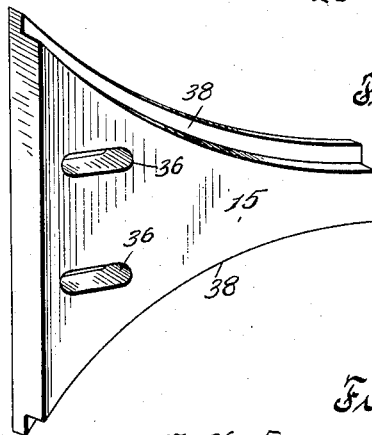
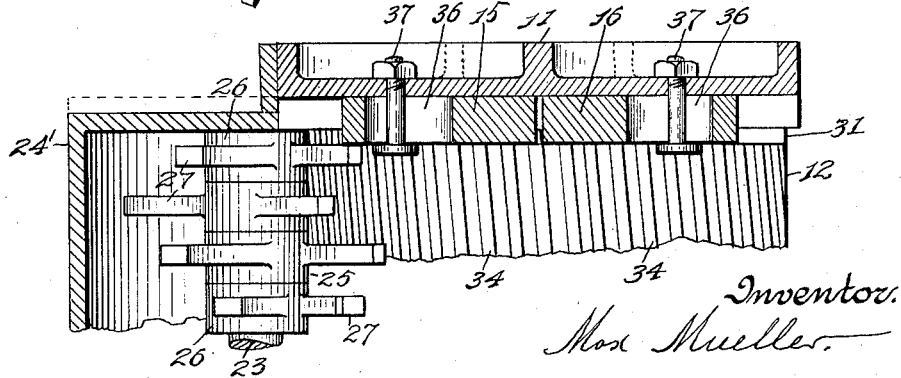

Patented Aug. 7, 1934

1,969,028

UNITED STATES PATENT OFFICE 1,969,028

MACHINE FOR FORMING CLAY PRODUCTS

Max Mueller, St. Louis, Mo.

Application January 28, 1933, Serial No. 653,937

7 Claims. (Cl. 25—11)

This invention relates to improvements in a machine for forming clay products, and has for its object a revolving mechanism by which the clay is treated and advanced to a forming die, and an agitator for properly mixing and feeding the clay to the rollers of the mechanism.

Another object of the invention is to equip the machine with rollers between which the clay is passed, the periphery of the rollers being provided with strips placed at intervals apart and arranged at an angle across the periphery, and by said strips the material or clay is advanced or fed to the forming die so provided.

Another object of the invention is to construct a machine having within its casing a plurality of rollers, the periphery of which being provided with strips for gripping the clay and advancing it, a hopper in which the clay is supplied to the rollers, and an agitator within the hopper and in close proximity to the rollers for agitating, mixing and advancing the clay to the rollers, and a forming die conveniently located at the outlet end through which the clay is passed for shaping and forming the product to be produced.

The machine has been especially designed for the forming of clay products such as hollow tiles, bricks, roofing tiles, or any article of clay product formation, the shape of the product depending upon the formation of the die through which the clay is passed.

One of the essential features of the invention is the formation of the rollers, which provides for the ready and easy means of repair when the strips become worn, and another feature is the filler plates located between the rollers which act as a preventative of the clay from passing sidewise from the rollers and lodge against the machine frame or housing.

The machine is indeed simple, yet after many experiments, and after having constructed various forms of rollers for the purpose, but all proving unsatisfactory, I have devised the present form of rollers which have proven absolutely satisfactory and operative in every respect. Heretofore when the surface of the rollers became worn it necessitated inserting an entire roller, whereas by this construction the strips can be readily removed and new strips replaced without removing the roller from the frame, it therefore becomes an item of saving, in material, labor and time.

The gears which rotate the rollers are so proportioned as to rotate the same with equal speed and in the proper direction, and between which the clay must pass as it is fed from the hopper to the forming die.

Another object of the invention is the general arrangement, construction and combination of parts as will be fully hereinafter described and set forth in the claims.

Figure 3 is a vertical central sectional view showing the internal construction.

Figure 4 is a top plan view of the same with the drive shaft broken away.

Figure 5 is an enlarged detail sectional view of a portion of the roller showing its manner of construction.

Figure 6 is an enlarged detail sectional view of a portion of the roller showing the position and application of the strips made use of for handling the clay.

Figure 7 is an enlarged detail sectional view of the agitator and hopper taken on the line 7—7 of Figure 3.

Figure 8 is a detail perspective view of one of the filler plates made use of.

Figure 9 is an enlarged detail horizontal sectional view showing the filler plates in their relative position and the agitator in relative position with the roller, the same being taken on the line 9—9 of Figure 3 and viewing the same in the direction indicated by the arrow.

Figure 1:
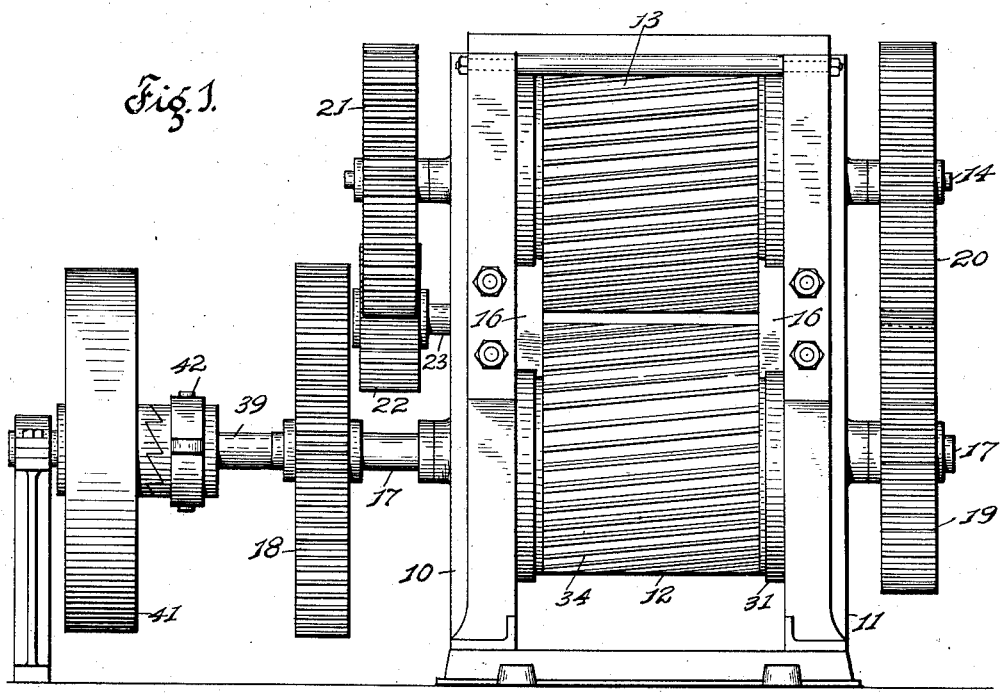
Figure 1 is a front view of my complete invention with the forming die removed.
Figure 2:
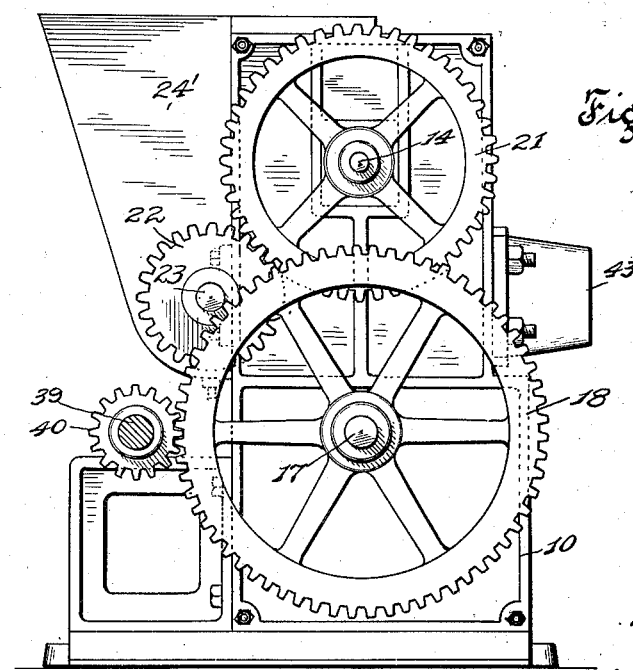
Figure 2 is a side view of the machine with the drive shaft broken away and in section.

In the general construction of my invention I provide a frame constructed of two side members 10 and 11 between which are located rollers 12 and 13 each mounted on a supporting shaft or axle having bearing in the frame.

The journal boxes in which the shaft 14 supporting the upper roller 13 is adjustably mounted so that the periphery of the rollers may be properly spaced, and to regulate the adjustment to the filler plates 15 and 16 positioned between the same.

The lower roller 12 is mounted on a supporting shaft 17 which has on its one end a large gear wheel 18, and on its opposite end a gear wheel 19 which meshes with a similar gear wheel 20 positioned on the shaft 14 of the upper roller, and on the opposite end of the shaft 14 is a gear wheel 21 which in turn meshes with a gear pinion 22 supported on the agitator shaft 23 which is supported in suitable bearings 24.

On the shaft 23 and within the housing 24' constituting the hopper is mounted an agitator 25 consisting preferably of a plurality of hubs or collars 26 each provided with arms 27, these arms being preferably slightly curved and tapered so as to cut through the clay as well as drive the same forward between the rollers, these members are set on the shaft in staggered position so as to assume a position as shown in Figure 3.

To the under side of the bottom end of the housing or hopper is supported a bar or the like 28 supporting a plurality of pins 29 which pass upwardly through the bottom of the hopper and extend upwardly between the arms 27 of the agitator in a manner as illustrated in Figure 7 which has a tendency to separate the clay from the arms as well as to prevent the clay from moving backward during the rotation of the agitator, these pins may be adjusted in any manner found practical and found desirable.

The rollers or drums made use of are constructed preferably of hollow formation for lightness their ends being suitably recessed forming a collar 30 in which a special ring or rim 31 is seated, this ring or rim being preferably of a chilled or extra hardened material so as to resist wear and the same are held in place by means of screws 32 or the like as shown in Figure 5.

The periphery of the drums or rollers are provided with channels 33 and arranged diagonally across the surface, in these channels are placed strips 34 which extend a reasonable distance beyond the periphery of the roller and these strips are firmly clamped in position by a binder strip 35, see Figure 6, and which may be removed when desiring to remove and replace any one of the strips 34.

To the inner surface of the frames are adjustably supported filler plates 15 and 16 the same being provided with elongated slots 36 through which are passed bolts 37 or the like and by which the plates are adjustably secured in position against the frame as well as against the peripheral surface of the roller rings 31, the position of the same in conjunction with the rollers being clearly illustrated in Figure 3.

These plates are of a somewhat wedge formation their edges 38 being recessed so as to conform with and snugly fit against the peripheral surface of the rings 31 thereby preventing the clay from passing sidewise during its travel between the rollers, the adjusting feature taking care of any wear between the same.

On the base of the machine are standards on which is supported a driving shaft 39, on this shaft is a gear pinion 40 meshing with the large gear 18 and by which the rollers are placed in operation, on this shaft is also mounted a drive pulley 41 and a clutch mechanism 42 both of which being of the ordinary construction and for controlling the operation of the machine.

When the machine is placed in operation, the rollers will travel in the direction as indicated by the arrows shown in Figure 3, and the agitator is likewise driven in the direction as indicated by the arrow in the same figure, and during this operation the clay which is placed in the hopper is advanced through the machine between the two rollers and fed into a forming die 43 securely bolted to the front of the frame as shown, this die may be of any shape conforming to the style and shape of the product to be fabricated.

By the style of rollers with the detachable strips and their diagonal formation on the periphery has a tendency to grip the clay and advance it under pressure to the forming die, compressing the clay firmly during its passage through the die positioned at its outlet end.

Some other changes may be made in the construction and arrangement of the invention above set forth without departing from the real spirit and purpose thereof; and it is my intention to cover by the following claims any modified form of structure or use of equivalents which may be reasonably included within their scope.

In some instances I may use three or more rollers depending upon conditions, yet the construction of the rollers will remain the same and the purpose for handling the clay to be advanced under pressure through a forming die for forming the product desired.

Having fully described my invention, what I claim, is:

1. A machine for forming clay products comprising a frame, a plurality of rollers axially mounted therein and simultaneously operated by meshing train of gears, a plurality of projecting detachable strips supported on the periphery of the rollers, said strips arranged on an angle across the periphery of said rollers, filler plates positioned between the rollers, a hopper, an agitator positioned in the hopper and in close proximity to the rollers, and means for rotating the elements simultaneously.

2. A machine of the character described comprising a frame, rollers mounted therein, said rollers having their ends provided with detachable rings seated in recesses formed on the end walls of said rollers, the rings being of a special hardened material to withstand wear and friction, grooves formed on the periphery of the rollers and arranged on a slant across the surface, strips of hardened material inserted in said grooves, a binder strip of non-corosive material wedged in the grooves beside the strips, the strips arranged to project beyond the surface of the roller, a clay supporting hopper, an agitator rotatably mounted therein and in close proximity of the rollers, separating pins in the hopper and in relation with the agitator, and means for placing the rollers and agitator in operation simultaneously, substantially as specified.

3. A machine for handling clay for the making of clay products, comprising a frame, rollers axially mounted within said frame, each of said rollers comprising a drum, its ends suitably recessed, rings of hardened material seated within said recesses, slanted grooves formed in the periphery of the drums, strips seated in said grooves and projecting beyond the peripheral surface thereof, filler plates positioned between the rollers and adjustably connected to the inner walls of the frame, said filler plates preventing the passage of clay between the rollers and frame, a hopper and an agitator located within the hopper substantially as specified.

4. A machine of the character described comprising a frame, rollers axially mounted therein, said rollers having their peripheries equipped with elongated slanted detachable projections for the movement of the clay, a hopper, an agitator axially mounted in the hopper, arms arranged on the agitator for the agitation of the clay and for feeding and pressing the same between the rollers, means located in the hopper to prevent the clay from backing up during the agitation of the clay, filler plates positioned between the rollers and adjustably connected to the inner walls of the frame, a forming die positioned on the front of the machine for the reception of the clay, and means for operating the rollers and agitator simultaneously, substantially as specified.

5. A machine of the class described comprising a frame, rollers located therein, said rollers having detachable means for gripping and advancing the clay under pressure, a forming die through which the clay is passed and formed into the required product, an agitator for directing and pressing the clay to the rollers and thoroughly mixing the same, and adjustable filler plates to prevent the clay from passing out sidewise from the rollers, substantially as specified.

6. A machine for forming clay products, comprising a suitable frame, a pair of rollers axially mounted therein their peripheries spaced a reasonable distance apart, a hopper, an agitator whose arms are arranged to advance the clay between the rollers, pins positioned in the hopper and between the agitator arms to prevent the backward movement of the clay, detachable strips positioned in grooves formed on the periphery of the rollers and arranged at an angle across the periphery of said rollers, means inserted in the grooves against the strips for binding the same therein, adjustable filler plates positioned between the rollers and secured against the side walls of the frame, a forming die supported by the frame in close proximity to the rollers, and in the path of the discharging clay, and means for operating the rotating mechanism.

7. A machine of the character described, comprising a frame, rollers supported therein, one of said rollers being adjustable in the frame, a hopper, an agitator, said rollers having their peripheries provided with rectangular grooves and arranged at an angle across their peripheries, detachable strips of hardened material imbedded in said grooves, binder strips inserted in said grooves at one side of the strips for retaining the same firm therein, said strips to be removed when worn and others replaced, adjustable filler plates positioned between said rollers and supported by the frame, the upper and lower ends of the filler plates contacting with the rims of the rollers, a forming die, and means for rotating the rollers and agitator simultaneously.

MAX MUELLER.